United States Patent [19]

McGuffie et al.

[11] 4,386,810

[45] Jun. 7, 1983

[54] RADIAL AND BI-DIRECTIONAL THRUST BEARING

[75] Inventors: Michael J. McGuffie, Harwinton, Conn.; David A. Lorinovich, Centerville, Ohio

[73] Assignee: The Torrington Company, Torrington, N.J.

[21] Appl. No.: 288,975

[22] Filed: Jul. 31, 1981

[51] Int. Cl.³ .............................................. F16C 19/18
[52] U.S. Cl. ................................. 308/174; 308/207 R; 308/216
[58] Field of Search ............... 308/174, 216, 217, 213, 308/207 R, 234

[56] References Cited

U.S. PATENT DOCUMENTS

| | | | |
|---|---|---|---|
| 2,592,178 | 4/1952 | Palazzo | 308/207 R |
| 2,962,328 | 11/1960 | Benktander | 308/216 X |
| 3,532,400 | 10/1970 | Benson et al. | 308/174 |
| 3,954,313 | 5/1976 | Haenel | 308/216 |
| 4,203,634 | 5/1980 | Back | 308/207 R X |
| 4,257,655 | 3/1981 | Mirring | 308/216 |
| 4,318,574 | 3/1982 | Nakamura | 308/216 |

*Primary Examiner*—Stuart S. Levy
*Assistant Examiner*—Thomas R. Hannon

*Attorney, Agent, or Firm*—F. S. Troidl

[57] ABSTRACT

The radial and bi-directional thrust bearing has a stationary, inner-annular race and a pair of rotatable outer races in tandem. The outer races each have a radially, inwardly-directed annular shoulder which is in contact with a radially, inwardly-directed annular shoulder of the other outer race. The inside diameters of the outer races are equal and larger than the outside diameter of a stationary, inner race, thus providing an annular space.

Two tandem sets of rollers are mounted in the annular space. A radially, outwardly-extending shoulder is provided on the inner race and extends partially across the annular space. A thrust ring is also mounted about the inner race. A sealing member extends across the annular space between the inner race shoulder and one outer race, and another sealing member extends across the space between the thrust ring and the other outer race. Thus, axial thrust loads in one direction are carried through the outer race shoulders, through one set of rollers, and through the inner race shoulder, and an axial thrust load in the other direction is carried through the outer race shoulders, through the other set of rollers, and through the thrust ring.

3 Claims, 4 Drawing Figures

RADIAL AND BI-DIRECTIONAL THRUST BEARING

This invention relates to anti-friction bearings. More particularly, this invention is a bearing which will absorb loads in the radial direction and also absorb thrust loads from either direction.

Most automotive air-conditioning compressors are clutched at the input pulley. An anti-friction clutch pulley bearing must carry radial and axial loads, have a minimum end play, be capable of handling high speed and high temperature, be sealed, and give long life without relubrication.

Briefly described, the invention is a radial and bidirectional thrust bearing including a stationary, inner-annular race, and rotatable tandem outer raceways separated by radially, inwardly-directed annular shoulder means. The inside diameters of the rotatable outer raceways are equal to one another and larger than the outside diameter of the inner-annular race to provide an annular space. Two tandem sets of rollers are rotatably-mounted in the annular space with the rollers of each set adapted to engage the radially, inwardly-extending annular shoulder means. A radially, outwardly-extending shoulder extends from the inner race, partially across the annular space, said shoulder being axially-spaced from the shoulders of the outer races and adapted to be engaged by the rollers of one set of rollers. A thrust ring is mounted about the inner race and extends partially across the annular space. The thrust ring is adapted to be engaged by the rollers of the other set of rollers. A sealing member extends across the annular space between the inner race shoulder and one outer raceway, and a sealing member extends across the space between the thrust ring and the other outer raceway. With this structure, axial thrust loads in one direction are carried through the outer raceway shoulder means, through one set of rollers, and through the inner race shoulder, and the axial thrust load in the other direction is carried through the outer raceway shoulder means, through the other set of rollers, and through the thrust ring.

The invention, as well as its many advantages, may be further understood by reference to the following detailed description and drawings in which.

Throughout the various figures, like parts are referred to by like numbers.

Figure 1:
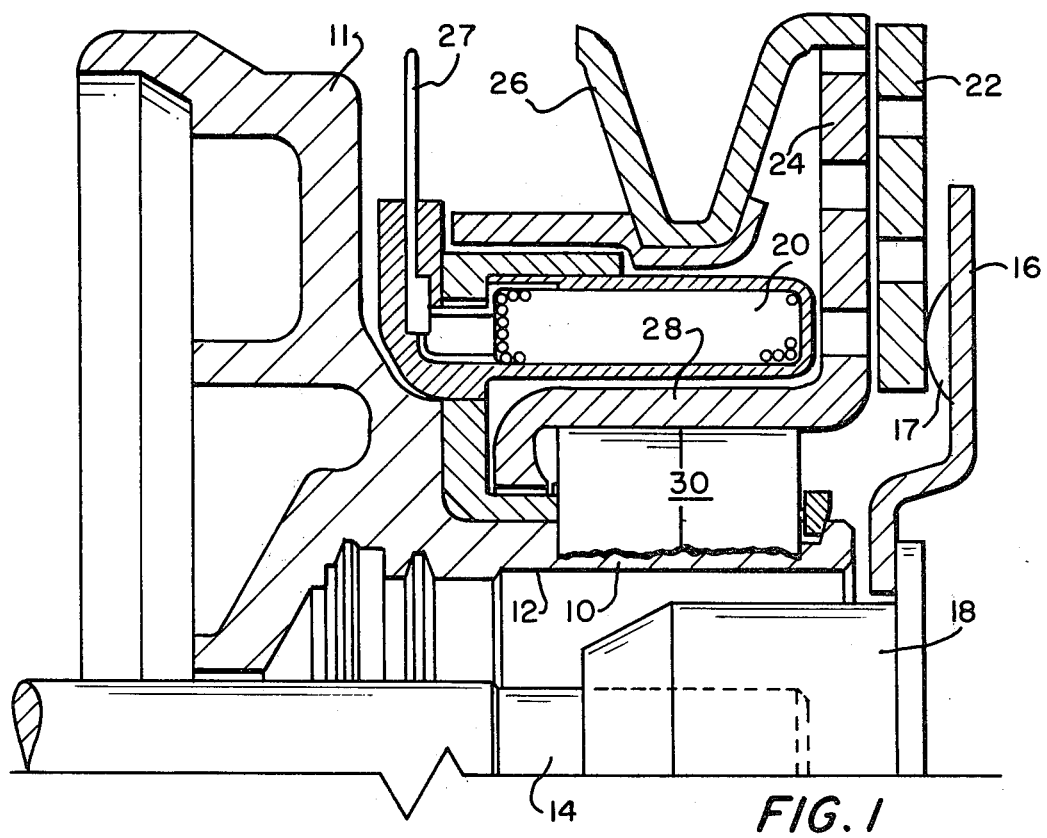
FIG. 1 is an elevational view, partly in section, showing the new radial and bi-directional thrust bearing supporting an automotive air-conditioning clutch pulley.

Referring to the drawings, and more particularly to FIG. 1, there is shown a stationary shaft 10 mounted on bracket 11 and having a central bore 12. An electromagnetic circuit includes magnetic member 16 with button 17. Magnetic member 16 is attached to rotatable shaft 14 in bore 12 by means of mount 18. The electromagnetic circuit also includes magnetic member 22, magnetic member 24 attached to pulley 26, and electromagnetic coil 20. An electric current through current lines 27 and electromagnetic coil 20 activates elements 18, 16, 17, and 22 so that magnetic member 22 is pulled into contact with magnetic member 24 to rotate magnetic member 22. A hub 28 extends longitudinally from the inside diameter of the annular magnetic member 24. The bi-directional thrust bearing 30 is mounted between the inside diameter of the hub 28 and the outside diameter of stationary member 10. When the automobile motor is running, pulley 26 continuously rotates so the hub 28 can rotate about the stationary shaft 10.

Figure 2:
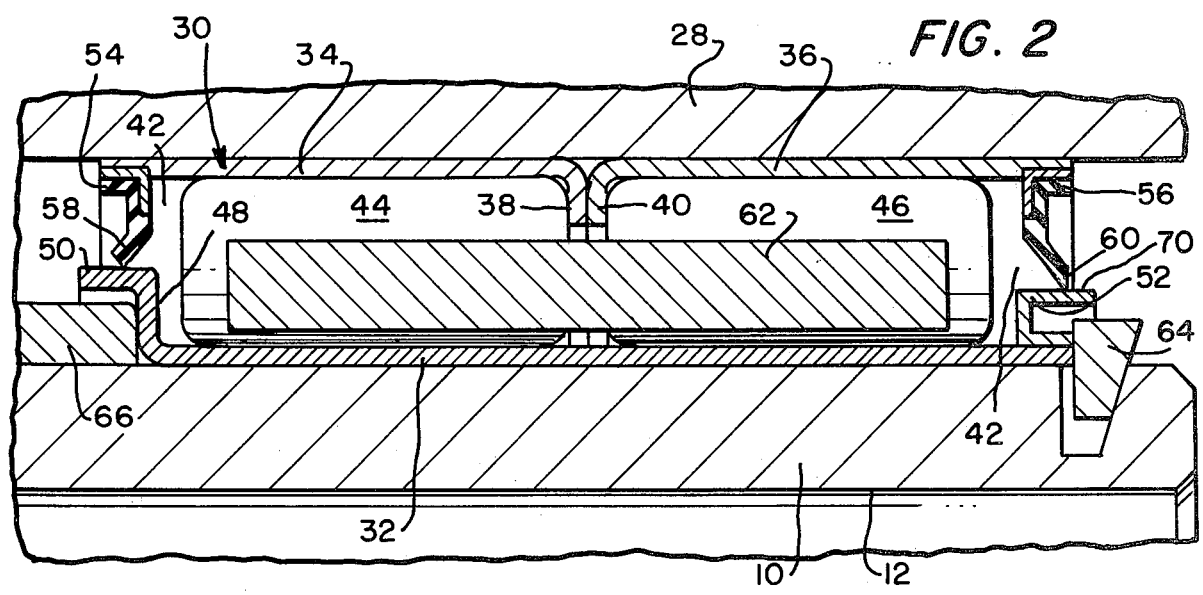
FIG. 2 is a sectional view, on an enlarged scale, of the radial and bi-directional thrust bearing of FIG. 1.

Referring to FIG. 2, the radial and bi-directional thrust bearing includes a stationary inner race having raceway 32 and mounted about the stationary shaft 10. A pair of rotatable outer races 34 and 36 are coaxially mounted in tandem about the stationary shaft 10. The outer races 34 and 36 each have a radially, inwardly-directed annular shoulder 38 and 40, respectively, which are in contact. Thus, rotatable tandem outer raceways are provided separated by shoulder means consisting of shoulders 38 and 40. If desired, a one-piece outer race with a single annular shoulder may be substituted for the two outer races 34 and 36 and two shoulders 38 and 40.

The inside diameters of the outer rotatable races 34 and 36 are equal, but larger than the outside diameter of the inner-annular race 32 to provide an annular space 42. Two tandem sets of rollers 44 and 46 are adapted to normally engage the radially, inwardly-directed annular shoulders 38 and 40, respectively.

The stationary inner race has a shoulder 48 extending from the raceway 32 partially across the annular space 42. Integral with the shoulder 48 is a larger diameter portion 50 extending perpendicularly from the shoulder 48. Shoulder 48 is axially-spaced from the shoulders 38 and 40 on the outer races 34 and 36, respectively.

A thrust ring 52 is mounted about the inner raceway 32 and extends partially across the annular space 42. The thrust ring is adapted to be engaged by the set of rollers 46.

A seal 54 extends across the annular space 42 from the inner race larger diameter portion 50 to the outer race 34. A seal 56 extends across the space 42 from the thrust ring 52 to the outer race 36. Seals 54 and 56 have lips 58 and 60, respectively, which are in sliding contact with the larger outer diameter portion 50 and thrust ring 52, respectively.

A retainer 62, which may be a finger retainer or any other suitable retainer, keeps the rollers in each set of rollers circumferentially-spaced.

The position of radial and bi-directional thrust bearing 30 is maintained by means of a snap-ring 64 and spacer 66 on shaft 10 and a press-fit of outer races 34 and 36 in the bore of hub 28.

As can be seen by looking at FIG. 2, rollers 44 and rollers 46 are normally axially spaced from shoulder 48 and thrust ring 52, respectfully.

Figure 3:
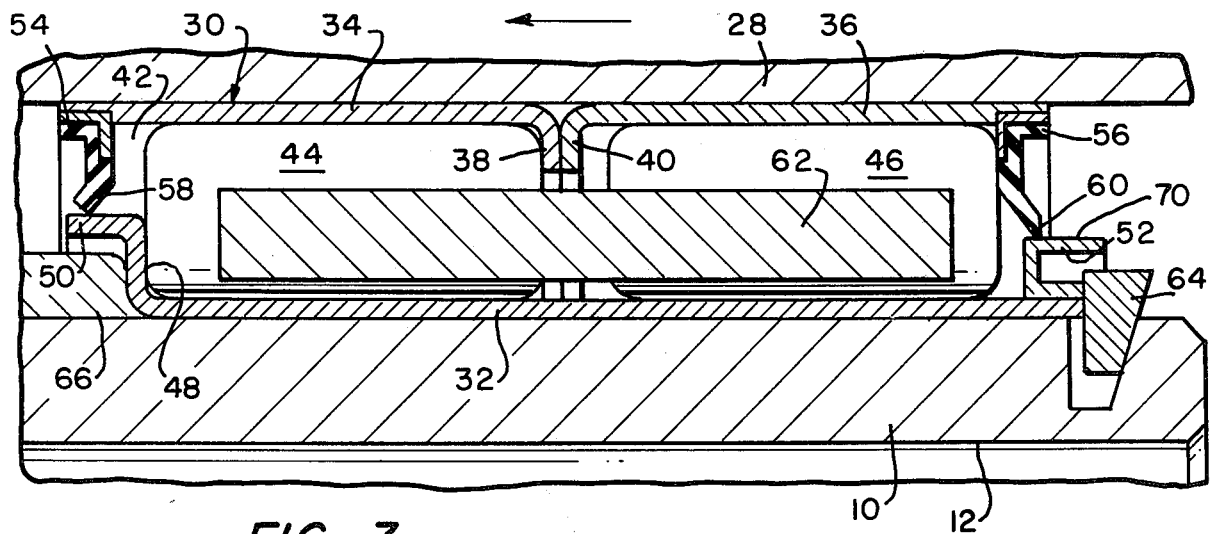
FIG. 3 is a view similar to FIG. 2, showing the positions of the parts of the bearing when a thrust load is exerted to the left, looking at the figure.

As can be seen by looking at FIG. 3, an axial thrust load in the direction of the arrow moves rollers 44 into engagement with shoulder 48 and the thrust is carried through the ends of the rollers 44 from the shoulder 38 in outer race 34 and into the shoulder 48 of the inner race. The larger diameter portion 50 is long enough to permit the lip 58 of sealing member 54 to slide on the larger diameter portion 50 and maintain the seal.

Figure 4:
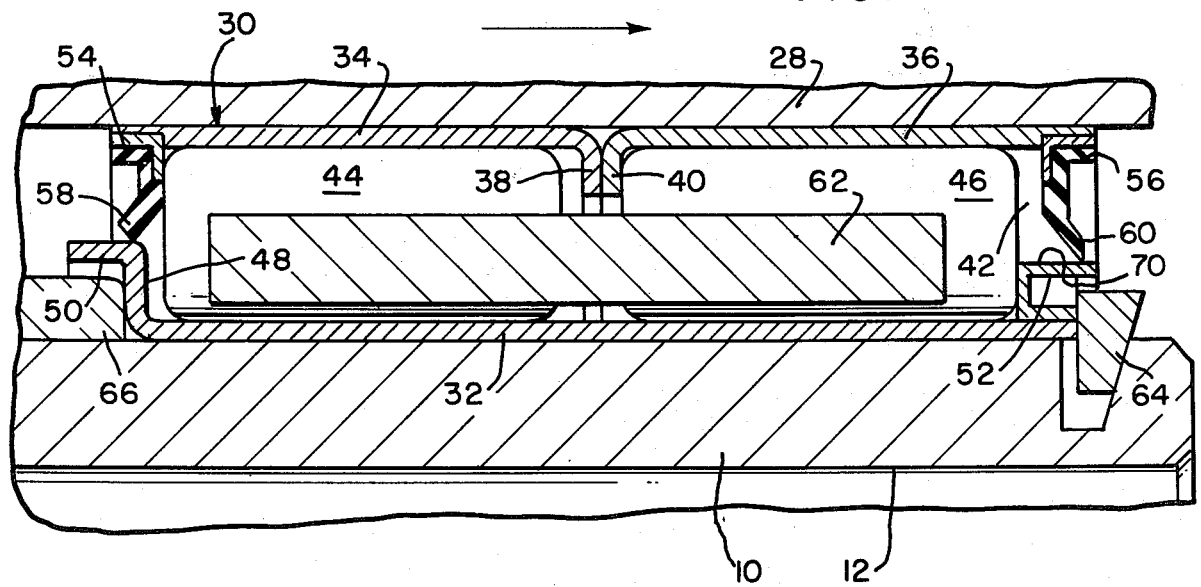
FIG. 4 is a view similar to FIG. 2 and FIG. 3, showing the positions of the parts of the bearing when a thrust is exerted to the right, looking at the figure.

Looking at FIG. 4, an axial thrust in the direction of the arrow moves rollers 46 into engagement with thrust ring 52 and the thrust is carried through the ends of the rollers 46 from the shoulder 40 in the outer race 36 into the thrust ring 52. The radial outside surface 70 of thrust ring 52 is long enough to permit the lip 60 of sealing member 56 to slide along the thrust ring 52 while maintaining the sealing engagement.

We claim:

1. A radial and bi-directional thrust bearing comprising: a stationary inner-annular race; rotatable tandem outer raceways separated by radially, inwardly-directed annular shoulder means, the inside diameters of the rotatable outer raceways being equal to one another and larger than the outside diameter of the inner-annular race to provide an annular space; two tandem sets of rollers rotatably-mounted in the annular space, the rollers of each set adapted to engage the radially, inwardly-extending annular shoulder means; a radially, outwardly-extending shoulder extending from the inner race partially across the annular space, said shoulder being axially-spaced from the shoulder means of the outer raceways and normally axially spaced from but adapted to be engaged by the rollers of one set of rollers; a thrust ring mounted about the inner race and extending partially across the annular space, said thrust ring being normally axially spaced from but adapted to be engaged by the rollers of the other set of rollers; a sealing member extending across the annular space between the inner race shoulder and one outer raceway; and a sealing member extending across the space between the thrust ring and the other outer raceway, whereby axial thrust loads in one direction will move one set of rollers into engagement with the inner race shoulder and the thrust load is carried through the outer raceway shoulder means, through one set of rollers, and through the inner race shoulder, and an axial thrust load in the other direction will move the other set of rollers into engagement with the thrust ring and the thrust load is carried through the outer raceway shoulder means, through the other set of rollers, and through the thrust ring.

2. A combined radial and thrust bearing in accordance with claim 1 wherein: a retainer keeps the rollers in each set of rollers circumferentially-spaced.

3. A combined radial and thrust bearing in accordance with claim 2 wherein: a larger diameter portion of the inner race extends perpendicularly from said shoulder, said larger diameter portion and said thrust ring, each being long enough so that one sealing member may slide on the larger diameter portion and the other sealing member may slide on the thrust ring in response to axial forces.

* * * * *